(12) United States Patent
Herbig et al.

(10) Patent No.: US 8,878,498 B2
(45) Date of Patent: Nov. 4, 2014

(54) METHOD FOR REDUCING A VOLTAGE RIPPLE DUE TO ROTATIONAL NONUNIFORMITY OF A GENERATOR DRIVEN BY AN INTERNAL COMBUSTION ENGINE

(75) Inventors: Ralf Herbig, Leonberg (DE); Julian Roesner, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/882,102

(22) PCT Filed: Sep. 9, 2011

(86) PCT No.: PCT/EP2011/065646
§ 371 (c)(1),
(2), (4) Date: Jul. 3, 2013

(87) PCT Pub. No.: WO2012/055628
PCT Pub. Date: May 3, 2012

(65) Prior Publication Data
US 2013/0286693 A1  Oct. 31, 2013

(30) Foreign Application Priority Data

Oct. 29, 2010  (DE) .......................... 10 2010 043 095

(51) Int. Cl.
| | | |
|---|---|---|
| H02P 11/00 | (2006.01) | |
| H02H 7/06 | (2006.01) | |
| H02P 9/06 | (2006.01) | |
| H02P 9/10 | (2006.01) | |
| H02J 7/14 | (2006.01) | |
| H02M 7/217 | (2006.01) | |

(52) U.S. Cl.
CPC ............ *H02M 7/2173* (2013.01); *H02P 9/105* (2013.01); *H02J 7/1492* (2013.01); *H02J 7/1446* (2013.01)
USPC .............................................. 322/37; 322/28

(58) Field of Classification Search
CPC ............ H02J 9/061; H02J 9/06; H02M 1/10; H02M 5/293; H02M 3/315
USPC ........................................................ 322/28, 37
See application file for complete search history.

(56) References Cited

U.S. PATENT DOCUMENTS

| | | | |
|---|---|---|---|
| 4,315,204 A | 2/1982 | Sievers et al. | .................... 322/28 |
| 5,144,220 A * | 9/1992 | Iwatani et al. | ................... 322/28 |

(Continued)

FOREIGN PATENT DOCUMENTS

| | | |
|---|---|---|
| DE | 44 40 830 | 5/1996 |
| DE | 197 33 212 | 2/1999 |

(Continued)

OTHER PUBLICATIONS

International Search Report for PCT/EP2011/065646, dated Dec. 21, 2012.

(Continued)

*Primary Examiner* — Pedro J Cuevas
(74) *Attorney, Agent, or Firm* — Kenyon & Kenyon LLP

(57) ABSTRACT

A method for reducing a ripple, caused by rotational nonuniformity of an internal combustion engine, in the output voltage of a generator which is driven by the internal combustion engine is provided. The generator has a stator winding, a rotor winding, a field controller, associated with the rotor winding, for regulating the output voltage of the generator, and a downstream power converter having controllable switching elements. To reduce the voltage ripple, the output voltage of the generator is regulated on the stator side by appropriately controlling the switching elements of the power converter.

8 Claims, 3 Drawing Sheets

(56) References Cited

U.S. PATENT DOCUMENTS

| | | | |
|---|---|---|---|
| 5,260,641 A * | 11/1993 | Iwatani | 322/28 |
| 5,323,101 A | 6/1994 | Pierret et al. | 322/28 |
| 6,353,307 B1 * | 3/2002 | Koelle et al. | 322/59 |
| 7,368,893 B2 * | 5/2008 | Tsuzuki | 322/28 |
| 2003/0075997 A1 | 4/2003 | Keim et al. | 310/68 D |
| 2007/0138795 A1 | 6/2007 | O'Gorman et al. | 290/40 F |
| 2007/0159140 A1 * | 7/2007 | Garces et al. | 322/59 |
| 2008/0054856 A1 * | 3/2008 | Lybbert | 322/8 |
| 2008/0265845 A1 * | 10/2008 | Lybbert | 322/28 |
| 2013/0049460 A1 * | 2/2013 | Herbig et al. | 307/10.1 |
| 2014/0131329 A1 * | 5/2014 | Meckler | 219/130.1 |

FOREIGN PATENT DOCUMENTS

| | | |
|---|---|---|
| DE | 10 027 859 | 12/2001 |
| DE | 103 61 215 | 7/2005 |
| EP | 0 847 485 | 3/1997 |
| EP | 0 847 487 | 6/1998 |
| JP | 63 114598 | 5/1988 |
| JP | 2000 316298 | 11/2000 |

OTHER PUBLICATIONS

Rivas, J, et al.: "Performance Improvement of Alternators with Switched-mode Rectifiers," *IEEE Transaction on Energy Conversion*, vol. 19, No. 3, Sep. 2004, p. 561-568.

\* cited by examiner

METHOD FOR REDUCING A VOLTAGE RIPPLE DUE TO ROTATIONAL NONUNIFORMITY OF A GENERATOR DRIVEN BY AN INTERNAL COMBUSTION ENGINE

BACKGROUND OF THE INVENTION

1. Field of the Invention

The present invention relates to a method for reducing a ripple, caused by rotational nonuniformity of an internal combustion engine, in the output voltage of a generator driven by the internal combustion engine.

2. Description of the Related Art

Claw pole generators having electrical excitation are usually used as generators in motor vehicles. The current through the rotor winding is used as a manipulated variable for regulating the desired output voltage or a requested torque, and is predefined by an associated field controller. This type of regulation is necessary, since otherwise, due to the highly variable engine speeds, greatly fluctuating voltage values would be supplied by the generator which could possibly damage the downstream electrical system.

Since the rotor winding typically has a time constant>150 ms, rapid control operations are not possible. However, in particular at low rotational speeds, in particular in the range of the idle speed, this results in voltage ripples, since in this case the power output of the generator is highly dependent on the rotational speed. If the rotational speed fluctuates very rapidly due to rotational nonuniformity in this range, the field controller is not able to respond quickly enough to the fluctuations on account of the rotor time constant of the rotor field, resulting in an undesirable ripple in the generator output voltage. This effect is further intensified in generators, which in addition to the rotor winding have permanent magnets for leakage flux compensation, since in this case the power characteristic curve has an even steeper slope.

Published European patent document EP 0 847 485 B1 discloses a method for damping torque fluctuations due to rotational nonuniformity of the internal combustion engine, a generator being used in motor mode to compensate for torque fluctuations. However, this further intensifies the voltage ripple.

It is therefore desirable to provide an option for reducing a ripple in the output voltage of a generator driven by the internal combustion engine.

BRIEF SUMMARY OF THE INVENTION

According to the present invention, a method is proposed for reducing a ripple, caused by rotational nonuniformity of an internal combustion engine, in the output voltage of a generator driven by the internal combustion engine.

The present invention may be used particularly advantageously in generators whose output voltage is rectified by a power converter having controllable switching elements. Such a power converter may be operated as a synchronous rectifier, a step-up converter, a step-down converter, a pulse-controlled inverter, etc. In the present case, a particularly simple option is provided for stator-side regulation by appropriate control of the switching elements, as a result of which the commutation angle and thus also the output direct current voltage are influenced.

Power converters having controllable switching elements are being increasingly used in generators in motor vehicles. On the one hand, these power converters offer advantages with regard to efficiency, and on the other hand, they also allow operation of the generator as a motor, for example to assist the internal combustion engine in starting or during propulsion. A generator having such a power converter is disclosed in published German patent application document DE 100 27 859 A1, for example.

In generators having a power converter (for example, starter generators having a pulse-controlled inverter), the current level on the stator side may be regulated via targeted control of the switching elements or rectifier elements, usually transistors. Since the stator winding has a significantly smaller time constant than the rotor winding, this type of regulation is particularly suitable for damping the described voltage fluctuations. Control voltage fluctuations in the vehicle electrical system are minimized.

The present invention is based essentially on the measure of using a so-called electrical freewheeling system, in which in generator mode of the electric machine the commutation angle in the near-idling range is controlled in such a way that the generator current is decreased at the rotational speed maximum and increased at the rotational speed minimum. This results in a lower current ripple, and thus also a lower voltage ripple. Suitable input variables for the regulation are the generator rotational speed and the generator voltage, as well as the position of the exciter field.

The regulation is preferably used when the voltage ripple exceeds a predefinable threshold value, for example 100 mV, the frequency of the generator alternating voltage is in a predefinable range, for example 25 Hz to 200 Hz, and the generator rotational speed is in a predefinable range, for example 1,000 rpm to 1,800 rpm. The regulation is advantageously terminated when the generator rotational speed exceeds a predefinable threshold value, for example 2,000 rpm. Regulation is subsequently carried out once again in a customary manner on the rotor side via the field controller, the power converter then normally being operated as a synchronous rectifier. When the regulation according to the present invention is used, the commutation angle is changed by appropriately controlling the switching elements until the voltage ripple is minimal or is below an acceptable threshold. As the result of changing the commutation angle, a portion of the current within the power converter is short-circuited, so that the ripple decreases at the output.

An arithmetic unit according to the present invention, for example a control unit of a motor vehicle, is set up, in particular by programming, to carry out a method according to the present invention.

Further advantages and embodiments of the present invention result from the description and the appended drawings.

It is understood that the features stated above and to be explained below may be used not only in the particular stated combination, but also in other combinations or alone without departing from the scope of the present invention.

The present invention is schematically illustrated with reference to exemplary embodiments in the drawings, and described in greater detail below with reference to the drawings.

DETAILED DESCRIPTION OF THE INVENTION

Figure 1:
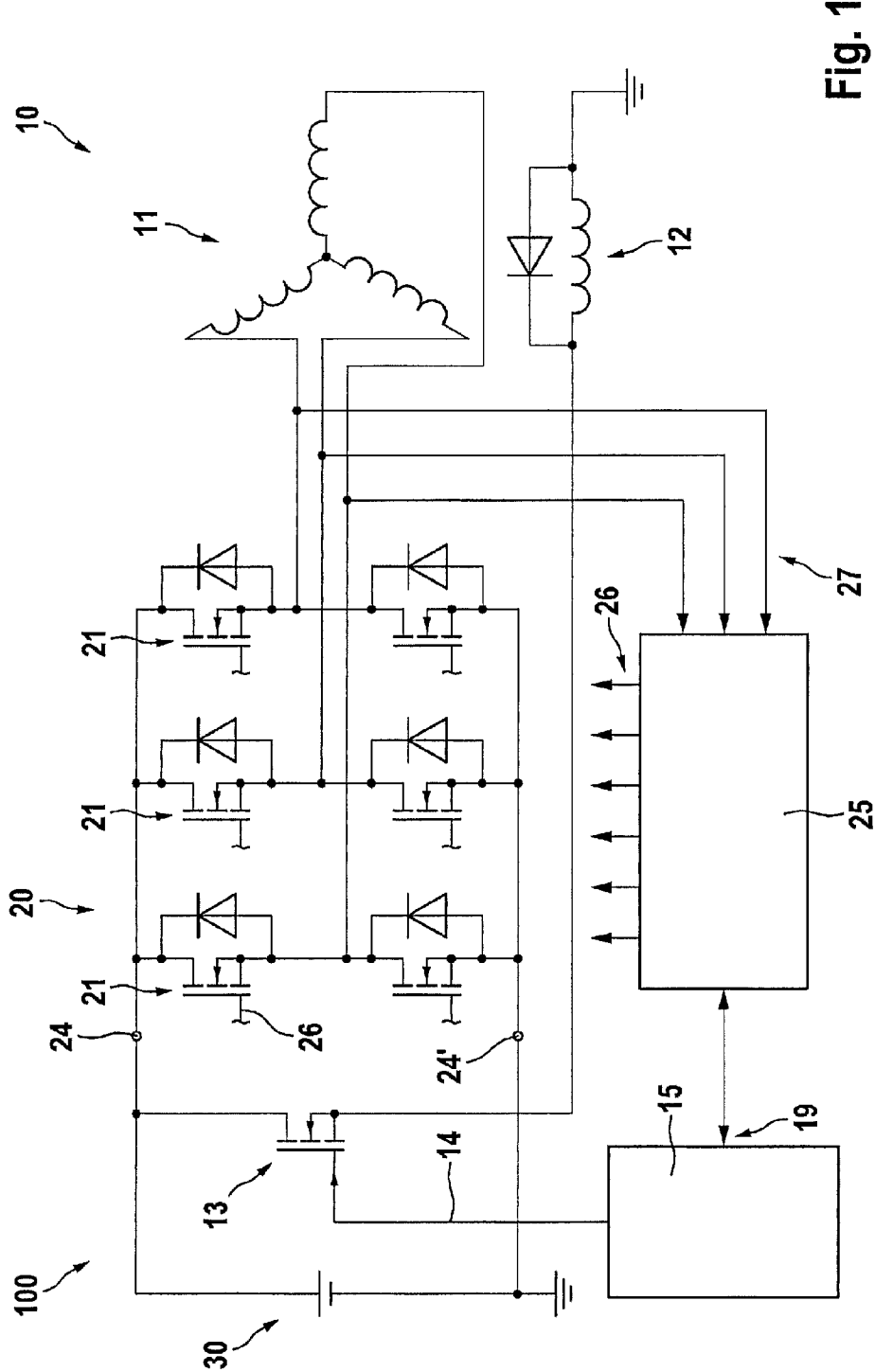
FIG. 1 shows one specific embodiment of a generator having a power converter with controllable switching elements, which may be the basis for the present invention.

FIG. 1 illustrates an electric machine, which may be the basis for the present invention and which is denoted overall by reference numeral 100, as a circuit diagram. The electric machine has a generator component 10 and a power converter component 20. The power converter component is operated in generator mode of the machine, usually as a rectifier.

Generator component 10 is illustrated strictly schematically in the form of stator windings 11, wired in a star-shaped configuration, and an excitation winding or rotor winding 12 connected in parallel with a diode. The rotor winding is switched in a clocked manner by a power switch 13 which is connected to a connector 24 of power converter component 20.

Power switch 13 is controlled according to a field controller 15, whereby power switch 13, as well as the diode connected in parallel to rotor winding 12, is generally integrated into an application-specific integrated circuit (ASIC) of the field controller.

A three-phase generator is illustrated within the scope of the present patent application. In principle, however, the present invention is also usable with generators having fewer or more phases, for example five-phase generators.

In the present case, power converter component 20 is designed as a B6 circuit, and has switching elements 21 which may be designed as MOSFETs 21, for example. MOSFETs 21 are connected to the particular stator windings 11 of the generator via busbars, for example. In addition, the MOSFETs are connected to connectors 24, 24', and when appropriately controlled, supply direct current to a vehicle electrical system 30 of a motor vehicle. Switching elements 21 are controlled by a control device 25 via control channels 26, not all of which are provided with reference numerals for the sake of clarity. Control device 25 receives in each case the phase voltage of the individual stator windings via phase channels 27. Further devices, not illustrated for the sake of clarity, may be provided for supplying these phase voltages.

In (synchronous) rectifier mode, control device 25 carries out an evaluation of the phase voltages provided via phase channels 27, and on this basis determines a respective switch-on and switch-off time of an individual MOSFET 21. The control via control channels 26 acts on the gate connectors of MOSFETs 21.

Known field controllers, such as field controller 15 provided within the scope of the present specific embodiment, have a so-called V-terminal connector 19 which is connected to a phase of the stator winding of the generator. The frequency of the V-terminal signal or of the phase input signal is evaluated in controller 15, and as a function of the parameters this signal is used for activating or deactivating the controller operation, and ultimately, for controlling power switch 13 via a control line 14. The phase signal for phase signal input 19 may, as illustrated, also be conducted through control device 25.

When the engine is started, the generator rotor together with field winding 12 starts to turn, and a voltage is induced in stator windings 11. These phase voltages are detected, for example based on frequency, by control device 25 and used for deducing or determining the control signals for individual MOSFETs 21.

Figure 2:
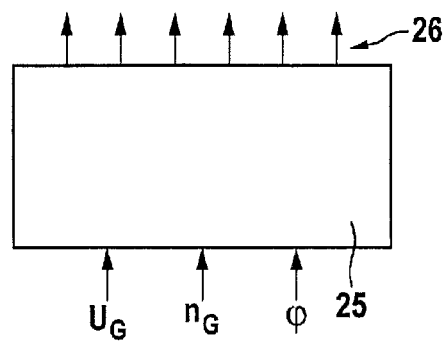
FIG. 2 shows one specific embodiment of a control device, designed according to the present invention, for carrying out the present invention.

One particularly preferred specific embodiment of the present invention is now described in greater detail with reference to FIGS. 1 and 2, in FIG. 2 a control device 25 being shown which is configured to carry out one particularly preferred specific embodiment of the present invention. The variation over time of generator voltage $U_G$, instantaneous rotational speed $n_G$ of generator component 10, and position angle $\phi$ of the generator component are supplied as input signals to control device 25. The position sensor determines the phase position of the exciter field. If the electric machine were operated in generator mode with diodes, the diodes would commutate at the natural commutation time (zero crossing of the diode current). However, when switching elements, for example power semiconductors, are used, this commutation time may be shifted; i.e., the power semiconductors remain switched through for a longer or shorter period of time.

Based on the present invention, control device 25 now determines appropriate control signals in order to control switching elements 21 for reducing an output voltage ripple. For this purpose, the commutation angle (and thus the phase position between the synchronous generated voltage and the stator voltage) is changed in such a way that the generator current is decreased at the rotational speed maximum and increased at the rotational speed minimum.

According to one preferred specific embodiment of the present invention, the commutation angle is changed at low rotational speeds by appropriately controlling switching elements 21 until the voltage ripple is minimal or is below an acceptable threshold.

The stator-side regulation of the generator voltage is preferably carried out only in a low rotational speed range around the idle speed, for example 1,000 rpm to 1,800 rpm. If generator rotational speed $n_G$ exceeds a predefinable threshold value, for example 2,000 rpm, the generator voltage is once again controlled in a customary manner via field controller 15 by specifying the current through rotor winding 12.

Figure 3A:
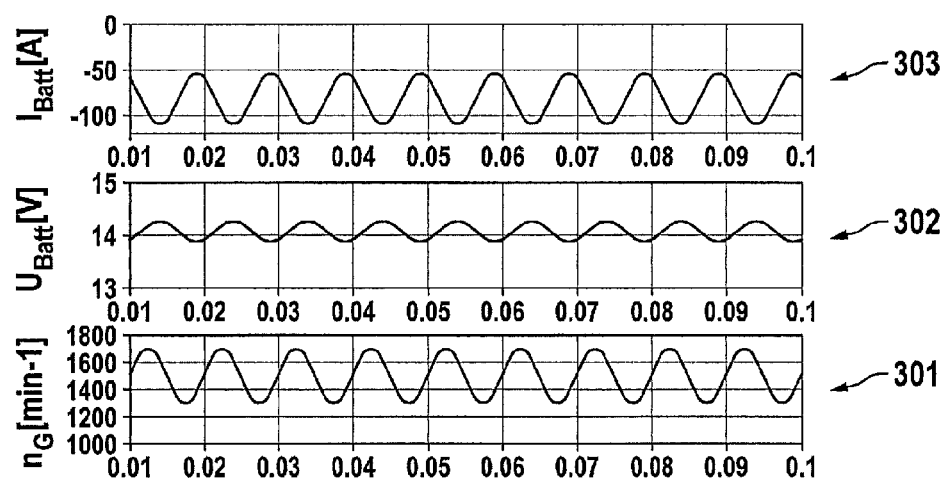
FIG. 3a shows current, voltage, and rotational speed curves for a regulation according to the related art.

FIG. 3a shows current, voltage, and rotational speed curves over time, which result during control of an electric machine 100 according to FIG. 1 according to the related art. The variation over time of generator rotational speed $n_G$ is illustrated in a diagram 301, the variation over time of rectified output voltage $U_{Batt}$ which results at connectors 24 and 24' is illustrated in a diagram 302, and the variation over time of associated output current $I_{Batt}$ is illustrated in a diagram 303. It is apparent that a distinct ripple in output voltage $U_{Batt}$ as well as in output current $I_{Batt}$ results due to the rotational nonuniformity.

Figure 3B:
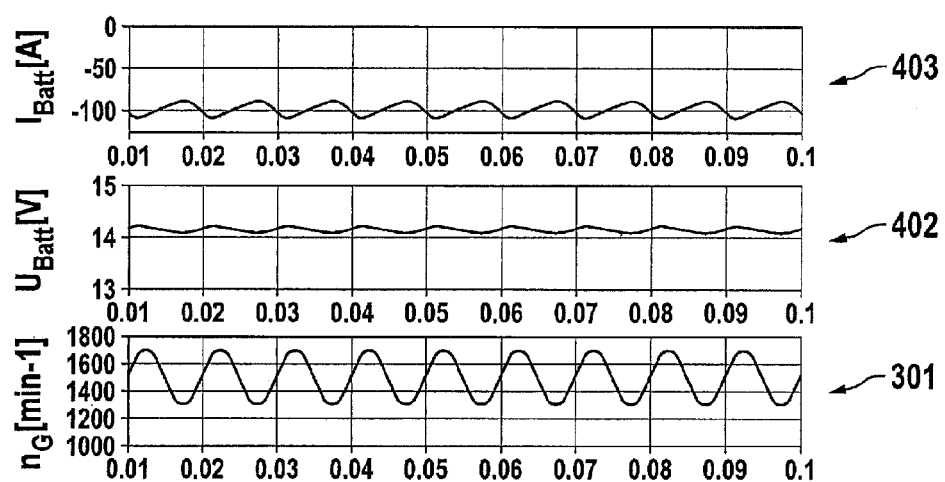
FIG. 3b shows current, voltage, and rotational speed curves for a regulation according to one specific embodiment of the present invention.

In comparison, FIG. 3b illustrates the variation over time of output voltage $U_{Batt}$ and of output current $I_{Batt}$ which result during control of electric machine 100 according to FIG. 1 according to the present invention. The variation over time of output current $I_{Batt}$ is illustrated in a diagram 403, and the variation over time of output voltage $U_{Batt}$ is illustrated in a diagram 402. The variation over time of generator rotational speed $n_G$ according to FIG. 3b corresponds to variation over time 301 according to FIG. 3a. It is apparent that a distinct reduction in the ripple in output voltage $U_{Batt}$ as well as in output current $I_{Batt}$ is achievable due to the preferred control of the switching elements.

What is claimed is:

1. A method for reducing a ripple, caused by rotational nonuniformity of an internal combustion engine, in an output voltage of a generator driven by the internal combustion engine, the generator having a stator winding, a rotor winding, and a field controller associated with the rotor winding, and a downstream power converter having controllable switching elements being provided, the method comprising:

operating the field controller to regulate the output voltage of the generator on the rotor side;

operating the power converter as a rectifier; and regulating the output voltage of the generator on the stator side by controlling the switching elements of the power converter to reduce the ripple in the output voltage.

2. The method as recited in claim 1, wherein the stator-side regulation of the output voltage of the generator is carried out at generator rotational speeds below a first specified threshold value.

3. The method as recited in claim 2, wherein the first specified threshold value is predefined as a function of an idle speed of the internal combustion engine.

4. The method as recited in claim 3, wherein the rotor-side regulation of the output voltage of the generator is carried out by setting a current through the rotor winding at generator rotational speeds above a second specified threshold value.

5. The method as recited in claim 4, wherein the second specified threshold value is predefined as a function of the first threshold value.

6. The method as recited in claim 5, wherein the regulation of the output voltage of the generator on the stator side is performed only when the ripple of the output voltage exceeds a predefined third threshold value.

7. A power supply unit for a motor vehicle, comprising:

a generator which has a stator winding, a rotor winding, and a field controller associated with the rotor winding for regulating the output voltage of the generator on the rotor side;

a downstream power converter which has controllable switching elements; and a control unit for stator-side regulation of the output voltage of the generator, wherein the control unit is configured to regulate the output voltage by controlling the switching elements of the power converter.

8. The power supply unit as recited in claim 7, wherein the control unit is an arithmetic unit configured to perform the stator-side regulation of the output voltage of the generator at generator rotational speeds below a first specified threshold value.

* * * * *